(12) United States Patent
Ogihara et al.

(10) Patent No.: US 10,802,493 B2
(45) Date of Patent: Oct. 13, 2020

(54) WORK MACHINE MANAGEMENT DEVICE, WORK MACHINE, AND WORK MACHINE MANAGEMENT SYSTEM

(71) Applicant: Komatsu Ltd., Tokyo (JP)

(72) Inventors: Masanori Ogihara, Tokyo (JP); Koji Takeda, Tokyo (JP); Tomonori Ozaki, Tokyo (JP); Akiharu Nishijima, Tokyo (JP); Ryuuen Kou, Tokyo (JP)

(73) Assignee: KOMATSU LTD., Tokyo (JP)

( * ) Notice: Subject to any disclaimer, the term of this patent is extended or adjusted under 35 U.S.C. 154(b) by 102 days.

(21) Appl. No.: 16/096,853

(22) PCT Filed: May 31, 2017

(86) PCT No.: PCT/JP2017/020265
§ 371 (c)(1),
(2) Date: Oct. 26, 2018

(87) PCT Pub. No.: WO2017/209181
PCT Pub. Date: Dec. 7, 2017

(65) Prior Publication Data
US 2019/0138016 A1    May 9, 2019

(30) Foreign Application Priority Data
May 31, 2016    (JP) .................................. 2016-109577

(51) Int. Cl.
*G05D 1/00* (2006.01)
*G05D 1/02* (2020.01)
(Continued)

(52) U.S. Cl.
CPC ........... *G05D 1/0212* (2013.01); *E02F 3/842* (2013.01); *E02F 9/205* (2013.01); *E02F 9/2045* (2013.01);
(Continued)

(58) Field of Classification Search
None
See application file for complete search history.

(56) References Cited

U.S. PATENT DOCUMENTS 6,539,294 B1    3/2003   Kageyama
9,487,129 B2 *  11/2016  Peterson ............ G01C 21/3658
(Continued)

FOREIGN PATENT DOCUMENTS

AU    2015362375 B2    6/2016
JP    63-307506 A     12/1988
(Continued)

OTHER PUBLICATIONS

International Search Report dated Jul. 4, 2017, issued for PCT/JP2017/020265.
(Continued)

*Primary Examiner* — Jonathan M Dager
(74) *Attorney, Agent, or Firm* — Locke Lord LLP (57) ABSTRACT

A work machine management device includes a manned-vehicle-data acquisition unit configured to acquire position data of a manned vehicle including a first direction indicator and operation data of the first direction indicator, a target-travel-route generation unit configured to generate a target travel route for a work machine, a blinker-data setting unit configured to set blinker data for controlling a second direction indicator of the work machine on the basis of link data obtained by associating the position data of the manned vehicle and the operation data of the first direction indicator, and an output unit configured to output the blinker data to the work machine traveling along the target travel route.

6 Claims, 8 Drawing Sheets

(51) Int. Cl.
*E02F 9/20* (2006.01)
*E02F 9/26* (2006.01)
*E02F 3/84* (2006.01)

(52) U.S. Cl.
CPC ............ *E02F 9/2054* (2013.01); *E02F 9/261* (2013.01); *G05D 1/02* (2013.01); *G05D 1/0274* (2013.01); *G05D 1/0278* (2013.01); *G05D 1/0287* (2013.01); *G05D 2201/021* (2013.01)

(56) References Cited

U.S. PATENT DOCUMENTS

| | | | | |
|---|---|---|---|---|
| 9,495,874 | B1* | 11/2016 | Zhu | B60W 30/09 |
| 9,550,499 | B2 | 1/2017 | Sakai | |
| 9,562,784 | B2* | 2/2017 | Lewis | G01S 19/13 |
| 9,616,809 | B1* | 4/2017 | Alasry | G06K 9/00845 |
| 10,011,216 | B1* | 7/2018 | Rovik | G06K 9/0061 |
| 10,126,753 | B2* | 11/2018 | Ogihara | G05D 1/0223 |
| 10,173,586 | B1* | 1/2019 | Kashchenko | G06K 9/00845 |
| 10,427,596 | B2* | 10/2019 | Haushalter | B60Q 1/50 |
| 10,525,873 | B2* | 1/2020 | Rowell | B60Q 1/346 |
| 10,589,664 | B2* | 3/2020 | Kashchenko | G06F 3/013 |
| 10,671,087 | B2* | 6/2020 | Collett | G05D 1/0088 |
| 2003/0067762 | A1* | 4/2003 | Fukawa | F21S 41/675 362/37 |
| 2004/0100373 | A1* | 5/2004 | Ponziani | B60Q 1/40 340/476 |
| 2004/0143381 | A1* | 7/2004 | Regensburger | B60Q 1/38 701/36 |
| 2005/0200467 | A1* | 9/2005 | Au | B60Q 1/343 340/465 |
| 2008/0282966 | A1* | 11/2008 | Williams | B60Q 1/50 116/35 R |
| 2009/0069977 | A1* | 3/2009 | Markyvech | B60Q 1/346 701/41 |
| 2009/0174540 | A1* | 7/2009 | Smith | B60Q 1/34 340/465 |
| 2011/0106376 | A1* | 5/2011 | Tijerina | B60Q 1/40 701/36 |
| 2011/0199200 | A1* | 8/2011 | Lueke | B60Q 1/38 340/435 |
| 2012/0083960 | A1* | 4/2012 | Zhu | B60R 1/00 701/23 |
| 2012/0089300 | A1* | 4/2012 | Wolterman | G08G 1/09 701/36 |
| 2012/0166078 | A1* | 6/2012 | Choi | G01C 21/3661 701/436 |
| 2012/0271510 | A1* | 10/2012 | Seymour | B60Q 1/346 701/36 |
| 2012/0310466 | A1* | 12/2012 | Fairfield | G05D 1/0255 701/28 |
| 2014/0266665 | A1* | 9/2014 | Haushalter | B60Q 1/50 340/464 |
| 2014/0309855 | A1* | 10/2014 | Tran | B60Q 1/38 701/36 |
| 2015/0075954 | A1* | 3/2015 | Mizuno | B60Q 1/343 200/61.3 |
| 2015/0203033 | A1* | 7/2015 | Watanabe | B60R 1/00 348/148 |
| 2015/0258928 | A1* | 9/2015 | Goto | B60Q 1/24 701/49 |
| 2015/0285650 | A1 | 10/2015 | Lewis et al. | |
| 2016/0031448 | A1* | 2/2016 | Sakai | B60W 10/06 701/23 |
| 2017/0088038 | A1* | 3/2017 | Geller | B60Q 1/50 |
| 2017/0106750 | A1* | 4/2017 | Tauchi | B60R 1/00 |
| 2017/0174123 | A1* | 6/2017 | Ogihara | G05D 1/0217 |
| 2017/0221366 | A1* | 8/2017 | An | G08G 1/096783 |
| 2017/0240096 | A1* | 8/2017 | Ross | G08G 1/0955 |
| 2018/0105186 | A1* | 4/2018 | Motomura | G05D 1/0088 |
| 2018/0201273 | A1* | 7/2018 | Xiao | G05D 1/0246 |
| 2018/0244195 | A1* | 8/2018 | Haight | G06K 9/00791 |
| 2018/0354412 | A1* | 12/2018 | Ogihara | G01C 21/20 |
| 2019/0084474 | A1* | 3/2019 | Ogihara | E02F 9/20 |
| 2019/0344827 | A1* | 11/2019 | Dix | B62D 15/025 |
| 2019/0384321 | A1* | 12/2019 | Nishi | B60Q 1/50 |

FOREIGN PATENT DOCUMENTS

| | | |
|---|---|---|
| JP | 05-324058 A | 12/1993 |
| JP | 11-296229 A | 10/1999 |
| JP | 2010-202021 A | 9/2010 |
| WO | 2015/033708 A1 | 3/2015 |

OTHER PUBLICATIONS

Office Action dated May 13, 2019, issued in the corresponding Australian patent application No. 2017275215.

* cited by examiner

WORK MACHINE MANAGEMENT DEVICE, WORK MACHINE, AND WORK MACHINE MANAGEMENT SYSTEM

FIELD

The present invention relates to a work machine management device, a work machine, and a work machine management system.

BACKGROUND

Both of autonomous work machines and manned vehicles may operate in the same mine. For example, when a driver who drives a manned vehicle understands a traveling direction of an autonomous work machine at an intersection, mine safety is improved. Patent Literature 1 discloses a technique of a direction indication method in an automated guided vehicle.

CITATION LIST

Patent Literature

Patent Literature 1: Japanese Laid-open Patent Publication No. 05-324058 A

SUMMARY

Technical Problem

The use of a direction indicator is considered to contribute to mine safety improvement. However, there is no established technique for using a direction indicator in an autonomous work machine.

An object of the present invention is to provide a work machine management device, a work machine, and a work machine management system which improve mine safety.

Solution to Problem

According to a first aspect of the present invention, a work machine management device comprises: a manned-vehicle-data acquisition unit configured to acquire position data of a manned vehicle including a first direction indicator and operation data of the first direction indicator; a target-travel-route generation unit configured to generate a target travel route for a work machine; a blinker-data setting unit configured to set blinker data for controlling a second direction indicator of the work machine on the basis of link data obtained by associating the position data of the manned vehicle with the operation data of the first direction indicator; and an output unit configured to output the blinker data to the work machine traveling along the target travel route.

According to a second aspect of the present invention, a work machine comprises: a manned-vehicle-data acquisition unit configured to acquire position data of a manned vehicle including a first direction indicator and operation data of the first direction indicator; a target-travel-route generation unit configured to generate a target travel route for a work machine; and a blinker-data setting unit configured to set blinker data for controlling a second direction indicator of the work machine on the basis of link data obtained by associating the position data of the manned vehicle with the operation data of the first direction indicator, wherein the second direction indicator of the work machine is controlled on the basis of the set blinker data.

According to a third aspect of the present invention, a work machine management system comprises: a manned-vehicle-data acquisition unit configured to acquire position data of a manned vehicle including a first direction indicator and operation data of the first direction indicator; a blinker-data setting unit configured to set blinker data for controlling a second direction indicator of a work machine on the basis of the position data of the manned vehicle and the operation data of the first direction indicator; and an output unit configured to output the blinker data to the work machine.

Advantageous Effects of Invention

According to an aspect of the present invention, there is provided a work machine management device, a work machine, and a work machine management system which improve mine safety.

DESCRIPTION OF EMBODIMENTS

Embodiments according to the present invention will be described below with reference to the drawings, but the present invention is not limited thereto.

Figure 1:
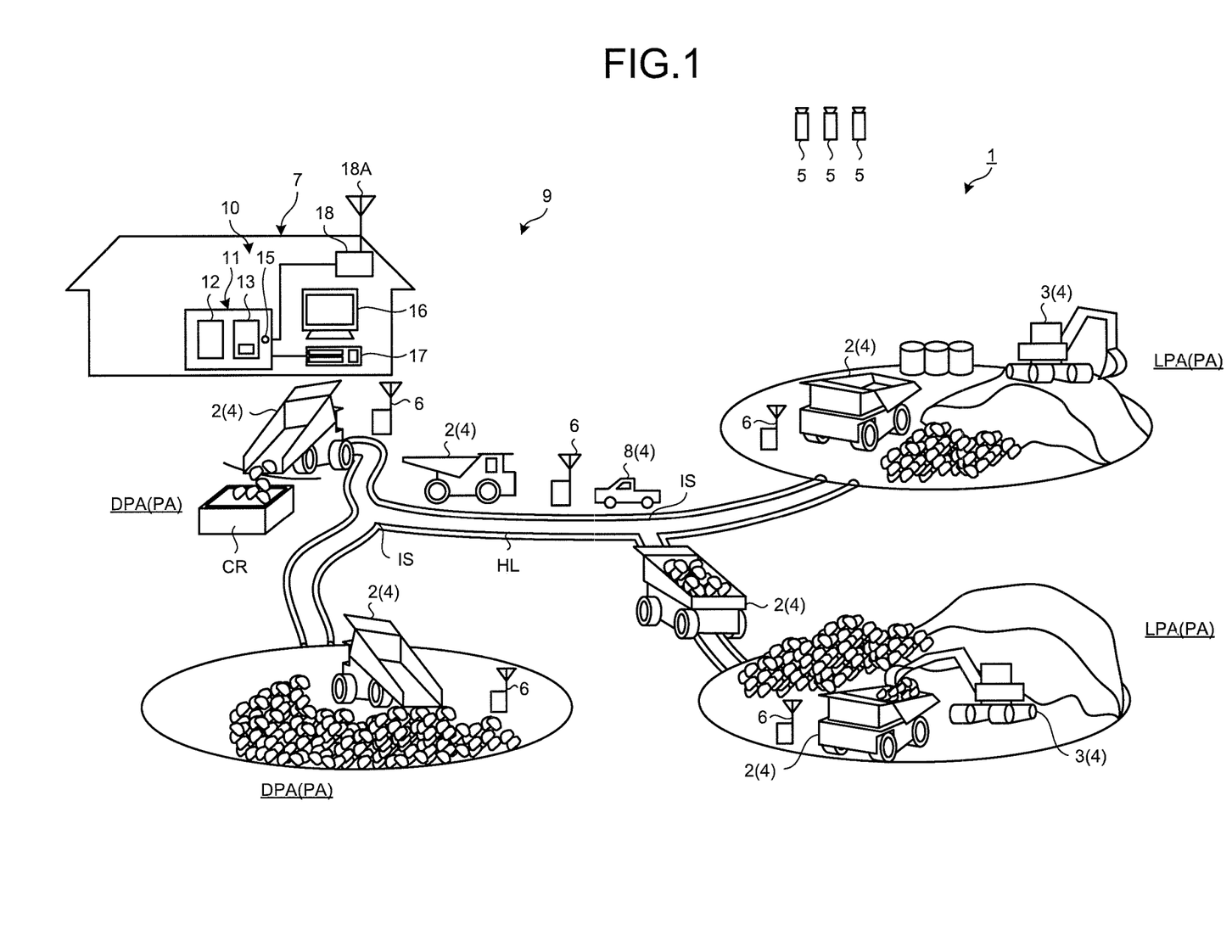
FIG. 1 is a diagram schematically illustrating an example of a work machine management system according to the present embodiment.

FIG. 1 is a diagram schematically illustrating an example of a work machine management system 1 according to the present embodiment. In the present embodiment, an example of a work machine being a mining machine 4 operating in a mine will be described. The management system 1 manages a mining machine 4. The management of the mining machine 4 includes at least one of operation management of the mining machine 4, evaluation of the productivity of the mining machine 4, evaluation of an operation technique of an operator of the mining machine 4, maintenance of the mining machine 4, and abnormality diagnosis of the mining machine 4.

The mining machine 4 is a general term for machinery used for various mine operations. The mining machine 4 includes at least one of a boring machine, an excavating machine, a loading machine, a transport machine, a crusher, and a vehicle driven by a driver. The excavating machine is a mining machine for excavating a mine. The loading machine is a mining machine for loading a transport machine. The loading machine includes at least one of a hydraulic excavator, an electric excavator, and a wheel loader. The transport machine is a mining machine for transporting a load. The crusher is a mining machine for crushing earth unloaded from a transport machine. The mining machine 4 is movable in a mine.

In the present embodiment, the mining machine 4 includes dump trucks 2 being a transport machine capable of traveling in a mine, other mining machines 3 different from the dump trucks 2, and a manned vehicle 8 driven by a driver. In the present embodiment, an example in which the dump trucks 2 are mainly managed by the management system 1 will be described.

As illustrated in FIG. 1, a dump truck 2 travels in worksites PA and on at least part of a transportation road HL leading to the worksites PA in a mine. The worksites PA include at least one of a loading area LPA and a dumping area DPA. The transportation road HL includes intersections IS. The dump truck 2 runs along a target travel route set on the transportation road HL and in the worksites PA.

The loading area LPA is a range of loading operation for loading the dump truck 2. The dumping area DPA is a range of dumping operation for dumping a load from the dump truck 2. In the example illustrated in FIG. 1, a crusher CR is provided in at least part of the dumping area DPA.

In the present embodiment, the dump truck 2 is an autonomous dump truck traveling autonomously in a mine on the basis of a command signal output from a management device 10. The autonomous traveling of the dump truck 2 means traveling on the basis of a command signal from the management device 10 without depending on the driver's operation.

In FIG. 1, the management system 1 includes the management device 10 disposed in a control facility 7 installed in the mine, and a communication system 9. The communication system 9 has a plurality of repeaters 6 for relaying data or a command signal. The communication system 9 wirelessly communicates data or a command signal between the management device 10 and a mining machine 4. Furthermore, the communication system 9 wirelessly communicates data or a command signal between a plurality of mining machines 4.

In the present embodiment, the positions of the dump trucks 2 and the positions of other mining machines 3 are detected by using a global navigation satellite system (GNSS). The GNSS is a global navigation satellite system. A global positioning system (GPS) is an example of the global navigation satellite system. The GNSS includes a plurality of positioning satellites 5. The GNSS detects a position defined by coordinate data of a latitude, a longitude, and an altitude. The position detected by the GNSS is an absolute position defined in a global coordinate system. With the GNSS, the positions of the dump trucks 2 and the other mining machines 3 in the mine are detected.

In the following description, a position detected by the GNSS is appropriately referred to as a GPS position. The GPS position is an absolute position and includes coordinate data of a latitude, a longitude, and an altitude. The absolute position includes estimated positions of the dump trucks 2 estimated with high accuracy.

Next, the management device 10 will be described. The management device 10 transmits data or a command signal to each mining machine 4 and receives data from the mining machine 4. As illustrated in FIG. 1, the management device 10 includes a computer 11, a display device 16, an input device 17, and a wireless communication device 18.

The computer 11 includes a processing device 12, a storage device 13, and an input/output unit 15. The display device 16, the input device 17, and the wireless communication device 18 are connected to the computer 11 via the input/output unit 15.

The processing device 12 performs arithmetic processing for managing each mining machine 4. The storage device 13 is connected to the processing device 12 and stores data for managing the mining machine 4. The input device 17 generates input data for managing the mining machine 4 by being operated by an administrator and supplies the input data to the processing device 12. The input device 17 includes at least one of, for example, a keyboard and a mouse for a computer, a touch sensor provided on a display screen of the display device 16. The display device 16 includes a flat panel display, such as a liquid crystal display. The processing device 12 performs arithmetic processing by using data stored in the storage device 13, data input from the input device 17, and data acquired via the communication system 9. The display device 16 displays a calculation processing result or the like from the processing device 12.

The wireless communication device 18 has an antenna 18A and is disposed in the control facility 7. The wireless communication device 18 is connected to the processing device 12 via the input/output unit 15. The communication system 9 includes the wireless communication device 18. The wireless communication device 18 is capable of receiving data transmitted from a mining machine 4. The data received by the wireless communication device 18 is output to the processing device 12 and stored in the storage device 13. The wireless communication device 18 is capable of transmitting data to the mining machine 4.

Figure 2:
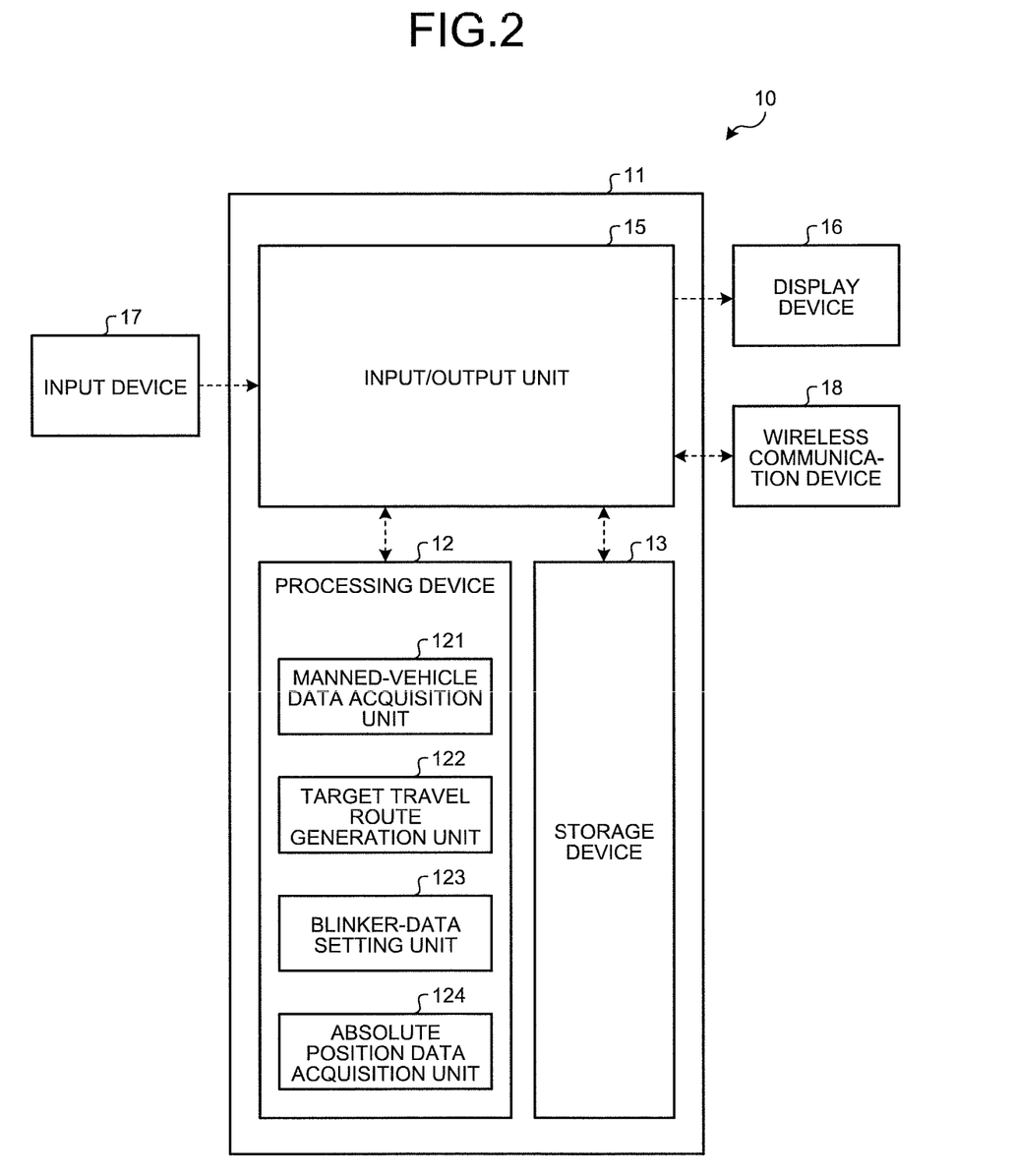
FIG. 2 is a functional block diagram illustrating an example of a work machine management device according to the present embodiment.

FIG. 2 is a functional block diagram illustrating an example of the management device 10 according to the present embodiment. As illustrated in FIG. 2, the processing device 12 of the management device 10 includes a manned-vehicle-data acquisition unit 121, a target-travel-route generation unit 122, a blinker-data setting unit 123, and an absolute-position-data acquisition unit 124. The manned-vehicle-data acquisition unit 121 acquires, from the manned vehicle 8, link data obtained by associating position data of the manned vehicle 8 including a direction indicator 86 with operation data of the direction indicator 86. The target-travel-route generation unit 122 generates a target travel route for each dump truck 2. The blinker-data setting unit 123 sets blinker data for controlling a direction indicator 37 of the dump truck 2 on the basis of link data acquired by the manned-vehicle-data acquisition unit 121. The absolute-position-data acquisition unit 124 acquires absolute position data of the dump truck 2. The blinker data is output from the input/output unit 15 functioning as an output unit to the dump truck 2 traveling along the target travel route, via the wireless communication device 18. The blinker data is stored in the storage device 13.

Figure 3:
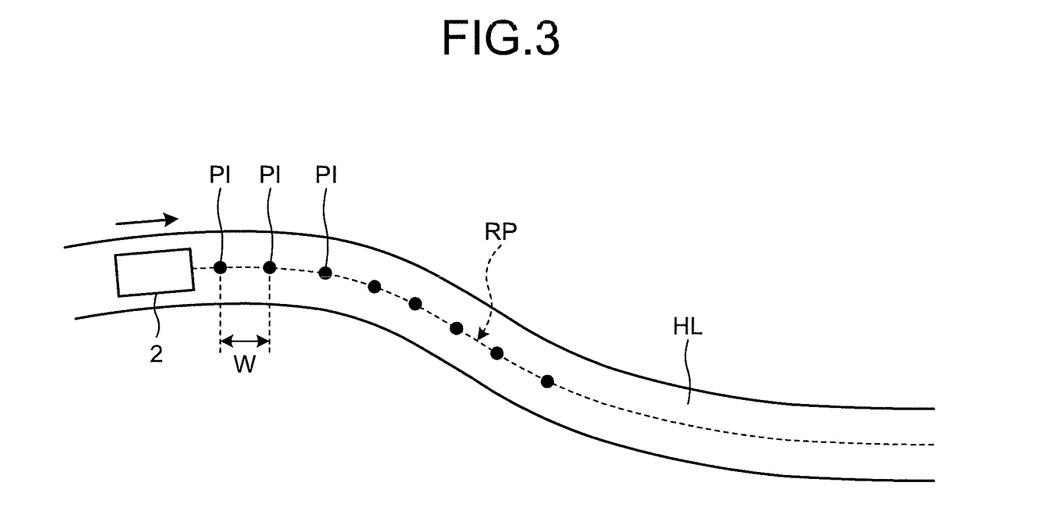
FIG. 3 is a schematic diagram illustrating a target travel route for a dump truck according to the present embodiment.

FIG. 3 is a schematic diagram illustrating a dump truck 2 traveling on the transportation road HL. The target-travel-route generation unit 122 of the processing device 12 generates traveling condition data including a target travel route for the dump truck 2 traveling in the mine. The traveling condition data includes an aggregate of a plurality of course points PI set at a constant interval W.

Each of the plurality of course points PI includes target absolute position data of the dump truck 2. A target travel route RP is an aggregate of a plurality of course points PI. The target travel route RP for the dump truck 2 is defined by a trajectory passing through the plurality of course points PI. For example, the dump truck 2 travels so that a reference position located at any place in the dump truck 2 matches the target absolute position data of the course points PI located ahead of the reference position.

The dump truck 2 is not limited to the embodiment in which the dump truck 2 travels along the target travel route RP being an aggregate of a plurality of course points PI, and for example, the dump truck 2 may travel along the target travel route RP with a shift from the target travel route RP. In addition, the dump truck 2 may travel on the transportation road HL in the mine not provided with the target travel route RP or the course points PI, and in such a situation the dump truck 2 may only travel in an area of the transportation road HL. In such a case, the target travel route represents the entire transportation road HL.

Each of the plurality of course points PI includes blinker data for controlling the direction indicators 37 of the dump truck 2. The blinker data is data representing operating conditions of the direction indicators 37 when the dump truck 2 passes the position of a course point PI. The blinker data includes data for lighting blinker lamps 37R for turning right of the direction indicators 37, data for lighting blinker lamps 37L for turning left of the direction indicators 37, data for simultaneously lighting the blinker lamps 37R for turning right and the blinker lamps 37L for turning left, and data for turning off the blinker lamps 37R and the blinker lamps 37L.

In the present embodiment, the blinker-data setting unit 123 sets blinker data to a course point PI on the basis of link data output from the manned vehicle 8. That is, in the present embodiment, blinker data is set on the basis of operation data of the direction indicator 86 of the manned vehicle 8. Each of the plurality of course points PI includes target absolute position data and blinker data.

The management device 10 outputs, to a dump truck 2, traveling condition data including a plurality of course points PI positioned forward in a traveling direction of the dump truck 2 via the wireless communication device 18. The dump truck 2 travels in the mine in accordance with traveling condition data transmitted from the management device 10. Furthermore, the dump truck 2 controls the direction indicators 37 in accordance with blinker data transmitted from the management device 10.

Figure 4:
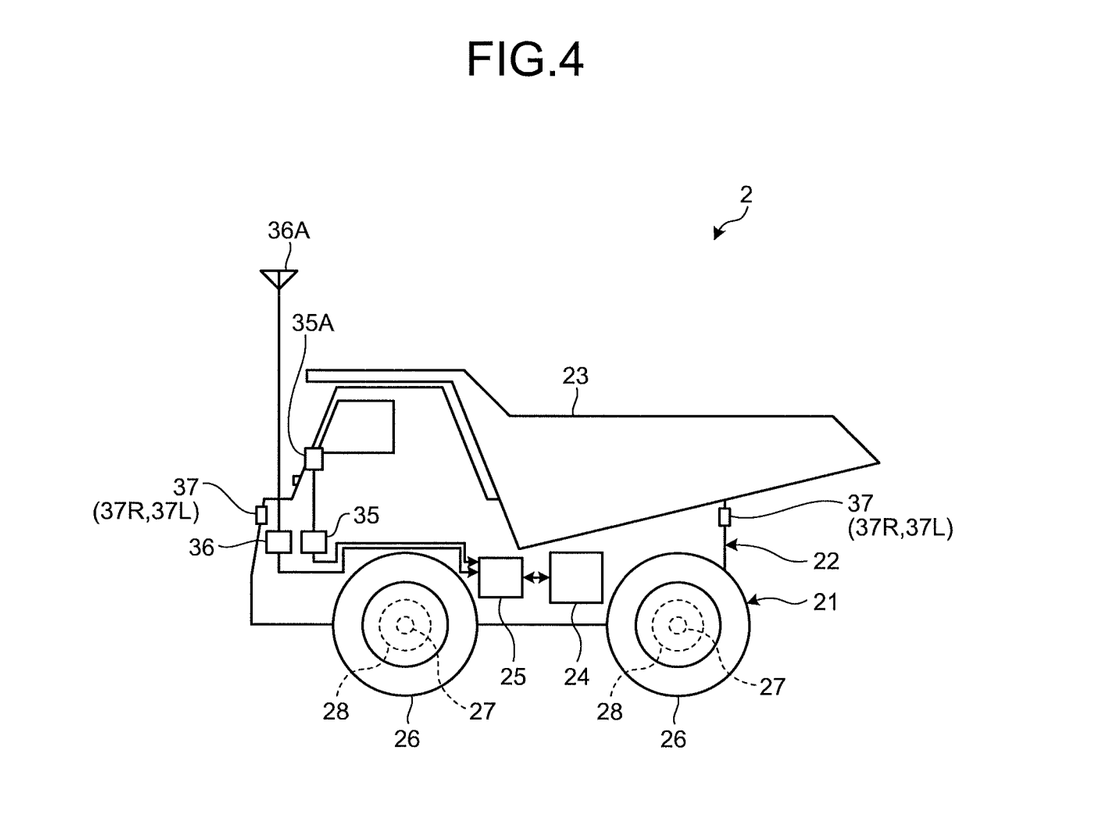
FIG. 4 is a diagram schematically illustrating an example of a dump truck according to the present embodiment.

Next, a dump truck 2 according to the present embodiment will be described. FIG. 4 is a diagram schematically illustrating an example of a dump truck 2 according to the present embodiment.

The dump truck 2 includes a travel unit 21 enabling traveling in a mine, a vehicle body 22 supported by the travel unit 21, a vessel 23 supported by the vehicle body 22, a driving device 24 for driving the travel unit 21, the direction indicators 37, and a control device 25.

The travel unit 21 includes wheels 26, axles rotatably supporting the wheels 26, steering units 27 capable of adjusting a traveling direction of the travel unit 21, and braking devices 28 for braking the travel unit 21.

The travel unit 21 is operated by a driving force generated by the driving device 24. The driving device 24 generates a driving force for accelerating the dump truck 2. The driving device 24 electrically drives the travel unit 21. The driving device 24 includes an internal combustion engine, such as a diesel engine, a generator operated by power of the internal combustion engine, and an electric motor operated by electric power generated by the generator. A driving force generated by the electric motor is transmitted to the wheels 26 of the travel unit 21. Consequently, the travel unit 21 is driven. The dump truck 2 autonomously travels by the driving force generated by the driving device 24 provided in the vehicle body 22. By adjusting an output from the driving device 24, the traveling speed of the dump truck 2 is adjusted. The driving device 24 may mechanically drive the travel unit 21. For example, power generated by the internal combustion engine may be transmitted to the wheels 26 of the travel unit 21 via a power transmission device.

Each of the steering units 27 is capable of adjusting the traveling direction of the travel unit 21. A traveling direction of the dump truck 2 including the travel unit 21 includes a direction of a front portion of the vehicle body 22. The steering unit 27 adjusts the traveling direction of the dump truck 2 by changing the direction of the wheels 26.

Each of the braking devices 28 generates a braking force for decelerating or stopping the dump truck 2. The control device 25 outputs an accelerator command signal for operating the driving device 24, a brake command signal for operating a braking device 28, and a steering command signal for operating a steering unit 27. The driving device 24 generates a driving force for accelerating the dump truck 2 on the basis of the accelerator command signal output from the control device 25. The braking device 28 generates a braking force for decelerating the dump truck 2 on the basis of the brake command signal output from the control device 25. On the basis of the steering command signal output from the control device 25, the steering units 27 generates a force for changing the direction of the respective wheels 26 to cause the dump truck 2 to linearly travel or swing.

The direction indicators 37 indicate a traveling direction of the dump truck 2. The direction indicators 37 are disposed at front portions and rear portions of the vehicle body 22. The direction indicators 37 include blinker lamps to indicate the traveling direction of the dump truck 2 to the surroundings by lighting or blinking the blinker lamps. The direction indicators 37 include the blinker lamps 37R for turning right lit when the dump truck 2 turns right and the blinker lamps 37L for turning left which are lit when the dump truck 2 turns left. The blinker lamps 37R for turning right are disposed at right portions of the vehicle body 22, and the blinker lamps 37L for turning left are disposed at left portions of the vehicle body 22.

In the following description, lighting of a blinker lamp 37R is referred to as right-turn lighting, and lighting of a blinker lamps 37L is referred to as left-turn lighting as appropriate.

The dump truck 2 includes a traveling-speed detector 31 for detecting the traveling speed of the dump truck 2, an acceleration detector 32 for detecting the acceleration of the dump truck 2, a position detector 35 for detecting the position of the dump truck 2, and a wireless communication device 36.

The traveling-speed detector 31 detects the traveling speed of the dump truck 2. The traveling-speed detector 31 includes a rotational speed sensor for detecting a rotational speed of a wheel 26. Since the rotational speed of the wheel 26 correlates with the traveling speed of the dump truck 2, a rotational speed value being a detection value detected by the rotational speed sensor is converted into a traveling speed value of the dump truck 2. The traveling-speed detector 31 may detect the rotational speed of the axle 26.

The position detector 35 includes a GPS receiver and detects a GPS position (coordinates) of the dump truck 2. The position detector 35 includes a GPS antenna 35A. The antennas 35A receives radio waves from the positioning satellites 5. The position detector 35 converts a signal based on a radio wave from each of the positioning satellites 5 received by the antenna 35A into an electric signal to calculate a position of the antenna 35A. By calculating a GPS position of the antenna 35A, the GPS position of the dump truck 2 is detected.

The communication system 9 includes the wireless communication device 36 provided in the dump truck 2. The wireless communication device 36 includes an antenna 36A. The wireless communication device 36 is configured to wirelessly communicate with the management device 10.

The management device 10 transmits a command signal including traveling condition data for the dump truck 2 to the control device 25 via the communication system 9. On the basis of the traveling condition data supplied from the management device 10, the control device 25 controls at least one of the driving device 24, a braking device 28, and a steering unit 27 of the dump truck 2 so that the dump truck 2 travels in accordance with the traveling condition data (including absolute position data at a plurality of course points PI).

The dump truck 2 transmits absolute position data indicating an absolute position of the dump truck 2 detected by the position detector 35 to the management device 10 via the communication system 9. The absolute-position-data acquisition unit 124 of the management device 10 acquires absolute position data of a plurality of the dump trucks 2 traveling in the mine. In addition, the absolute-position-data acquisition unit 124 of the management device 10 acquires not only the absolute position data of the dump trucks 2 but also absolute position data of each of the other mining machines 3 including the position detector 35.

Figure 5:
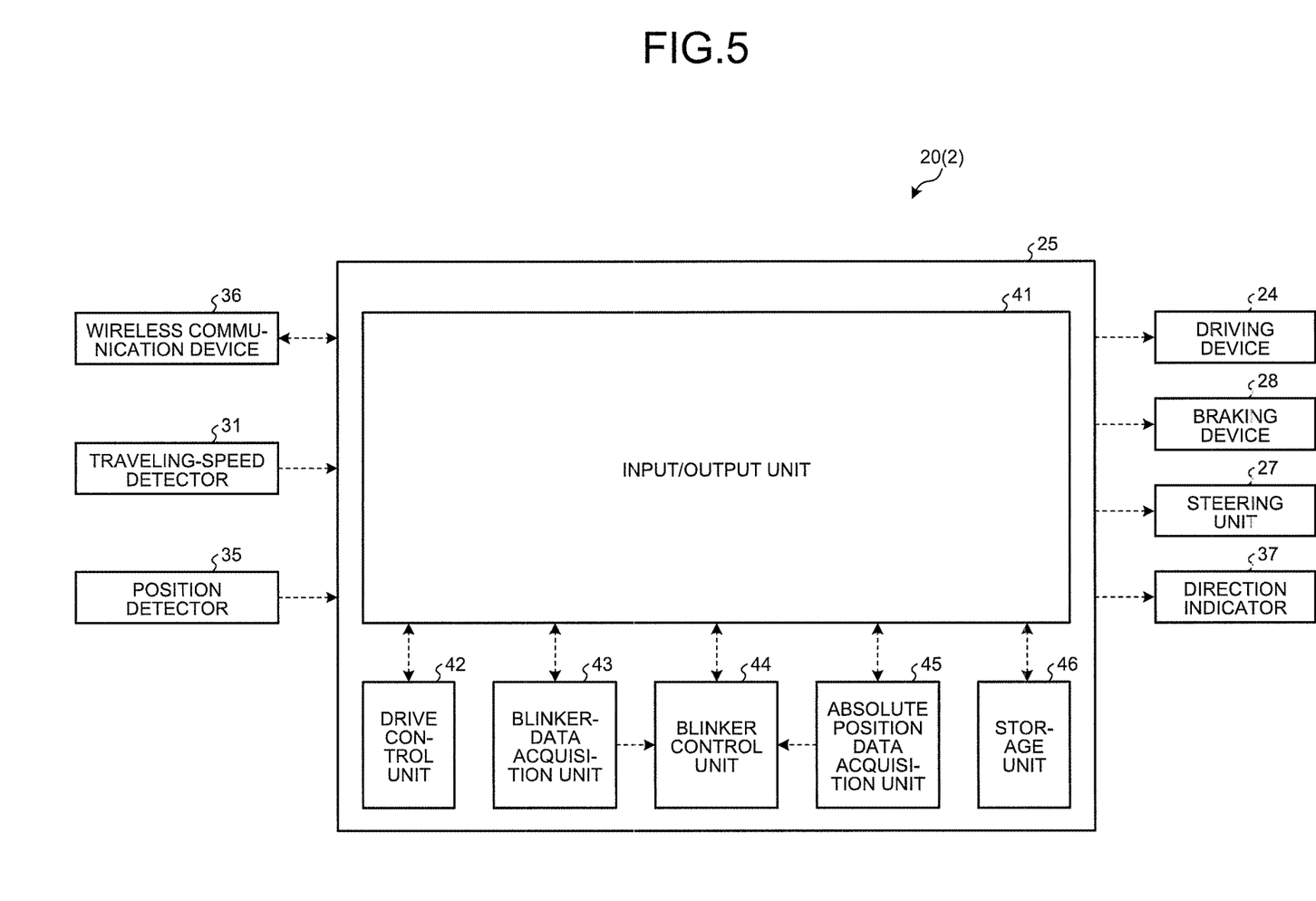
FIG. 5 is a control block diagram illustrating an example of a control system of a dump truck according to the present embodiment.

Next, a control system 20 of a dump truck 2 according to the present embodiment will be described. FIG. 5 is a control block diagram illustrating the control system 20 according to the present embodiment. The control system 20 is mounted to the dump truck 2.

As illustrated in FIG. 5, the control system 20 includes the wireless communication device 36, the traveling-speed detector 31, the position detector 35, the control device 25, the driving device 24, the braking devices 28, the steering units 27, and the direction indicators 37.

The control device 25 includes an input/output unit 41, a drive control unit 42, a blinker-data acquisition unit 43, a blinker control unit 44, an absolute-position-data acquisition unit 45, and a storage unit 46.

The input/output unit 41 acquires blinker data and traveling condition data output from the management device 10, traveling speed data indicating the traveling speed of the dump truck 2 output from the traveling-speed detector 31, and position data indicating the position of the dump truck 2 output from the position detector 35. Furthermore, the input/output unit 41 outputs an accelerator command signal to the driving device 24, outputs a brake command signal to a braking device 28, and outputs a steering command signal to a steering unit 27.

The drive control unit 42 outputs an operation control signal for controlling the travel unit 21 of the dump truck 2 on the basis of specified traveling condition data. The travel unit 21 includes the braking devices 28 and the steering units 27. The drive control unit 42 outputs an operation control signal to the travel unit 21 including the driving device 24, the braking devices 28, and the steering units 27. The operation control signal includes an accelerator signal output to the driving device 24, a brake command signal output to the braking device 28, and a steering command signal output to the steering unit 27.

The blinker-data acquisition unit 43 acquires blinker data for controlling the direction indicator 37 of the dump truck 2. The blinker-data acquisition unit 43 acquires blinker data output from the management device 10.

The blinker control unit 44 outputs a blinker control signal to the direction indicator 37 provided at the dump truck 2, on the basis of blinker data acquired by the blinker-data acquisition unit 43. The blinker control signal includes a lighting signal for lighting a direction indicator 37 and a light extinction signal for turning off a direction indicator 37. The lighting signal includes a right-turn lighting signal, a left-turn lighting signal, and a hazard lighting signal for simultaneous right-turn lighting and left-turn lighting.

The absolute-position-data acquisition unit 45 acquires absolute position data of the dump truck 2 from detection data from the position detector 35.

The storage unit 46 stores traveling condition data for the dump truck 2 acquired by the wireless communication device 36. The traveling condition data includes the blinker data for controlling the direction indicator 37.

Figure 6:
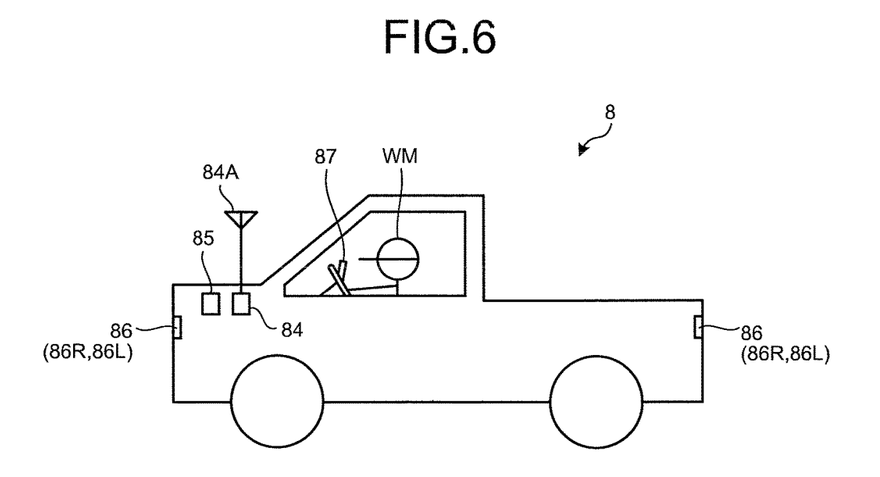
FIG. 6 is a diagram schematically illustrating an example of a manned vehicle according to the present embodiment.

Next, the manned vehicle 8 according to the present embodiment will be described. FIG. 6 is a diagram schematically illustrating an example of the manned vehicle 8 according to the present embodiment.

The manned vehicle 8 includes a driver's compartment for a driver WM. The manned vehicle 8 is operated by the driver WM in the driver's compartment. The manned vehicle 8 is a vehicle, such as a passenger car, and is smaller than the dump truck 2.

The manned vehicle 8 includes direction indicators 86. The direction indicators 86 indicate a traveling direction of the manned vehicle 8. The direction indicators 86 are disposed at front portions and rear portions of the manned vehicle 8. The direction indicators 86 include blinker lamps to inform of the traveling direction of the manned vehicle 8 by lighting or blinking blinker lamps. The direction indicators 86 include blinker lamps 86R for turning right lit or blinked when the manned vehicle 8 turns right, and blinker lamps 86L for turning left lit or blinked when the manned vehicle 8 turns left. The blinker lamps 86R for turning right are disposed at right portions of the manned vehicle 8, and the blinker lamps 86L for turning left are arranged at left portions of the manned vehicle 8.

In the following description, lighting of a blinker lamp 86R is referred to as right-turn lighting, and lighting of a blinker lamps 86L is referred to as left-turn lighting as appropriate.

The direction indicators 86 are operated by using an operation device 87, such as a blinker lever, provided in the driver's compartment. The driver WM operates the operation device 87 to start and stop the operation of the direction indicators 86. The operation of the operation device 87 provided in the manned vehicle 8 starts and stops the operation of the direction indicators 86.

The manned vehicle 8 includes a wireless communication device 84. The wireless communication device 84 includes an antenna 84A. The wireless communication device 84 can perform data communication with the management device 10 and a dump truck 2. The communication system 9 includes the wireless communication device 84.

Furthermore, the manned vehicle 8 includes a position detector 85 for acquiring position data of the manned vehicle 8. The position detector 85 includes a GPS receiver and detects a GPS position (coordinates) of the manned vehicle 8.

Figure 7:
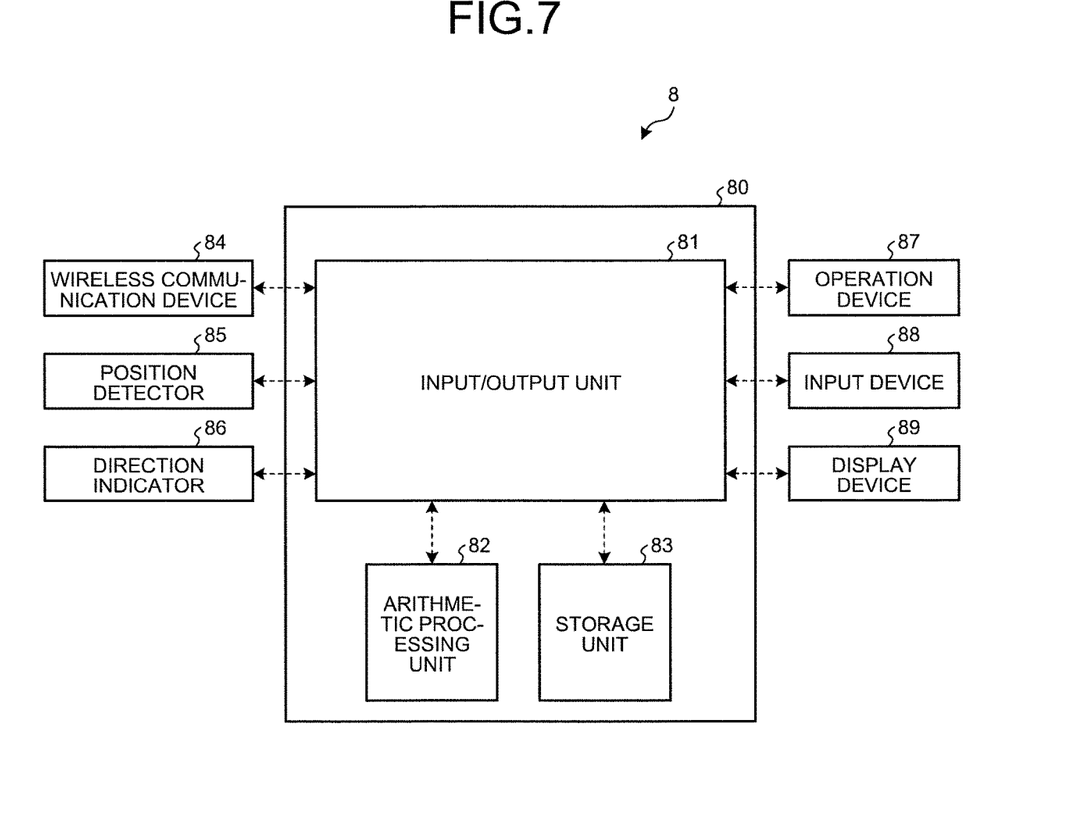
FIG. 7 is a control block diagram illustrating an example of a control system of the manned vehicle according to the present embodiment.

Next, a control system of the manned vehicle 8 according to the present embodiment will be described. FIG. 7 is a control block diagram illustrating the control system of the manned vehicle 8 according to the present embodiment. The control system of the manned vehicle 8 is mounted to the manned vehicle 8.

As illustrated in FIG. 7, the control system of the manned vehicle 8 includes a computer 80, the wireless communication device 84, the position detector 85, the direction indicators 86, the operation device 87, an input device 88, and a display device 89.

The computer 80 includes an input/output unit 81, an arithmetic processing unit 82, and a storage unit 83.

The arithmetic processing unit 82 generates link data by associating position data of the manned vehicle 8 detected by the position detector 85 with operation data of the direction indicator 86. The operation data of the direction indicator 86 includes operation start time point at which the operation of the direction indicators 86 is started and operation finish time point at which the operation of the direction indicators 86 is finished. The operation of the direction indicators 86 is started and finished by the operation of the operation device 87. The arithmetic processing unit 82 generates link data by associating the position data of the manned vehicle 8 detected by the position detector 85 with the operation data of a direction indicator 86 defined by the operation of the operation device 87. The link data includes position data of the manned vehicle 8 obtained when the direction indicator 86 starts to operate and position data of the manned vehicle 8 obtained when the direction indicator 86 finishes the operation thereof. The storage unit 83 stores the link data generated by the arithmetic processing unit 82.

The input/output unit 81 outputs link data generated by the arithmetic processing unit 82 to the management device 10 via the wireless communication device 84. The input/output unit 81 may output the link data generated by the arithmetic processing unit 82 to a dump truck 2 via the wireless communication device 84.

The input device 88 and the display device 89 are disposed in the driver's compartment of the manned vehicle 8. The input device 88 generates input data for managing a mining machine 4 by being operated by the driver WM and supplies the input data to the computer 80. The input device 88 includes at least one of, for example, a keyboard and a mouse for a computer, a touch sensor provided on a display screen of the display device 89. The display device 89 includes a flat panel display such as a liquid crystal display.

Figure 8:
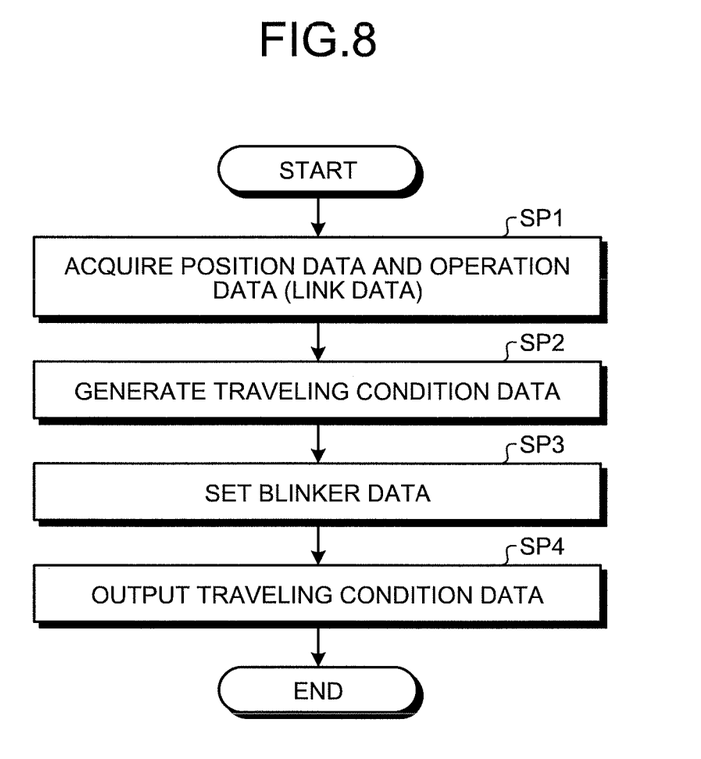
FIG. 8 is a flowchart illustrating an example of operation of the management system according to the present embodiment.

Next, a management method for the dump truck 2 according to the present embodiment will be described. FIG. 8 is a flowchart illustrating an example of operation of the management system 1 according to the present embodiment.

In order to generate a target travel route RP, a test run in a mine using the manned vehicle 8 is carried out. The manned vehicle 8 performs a test run for the mine while being operated by the driver WM.

Figure 9:
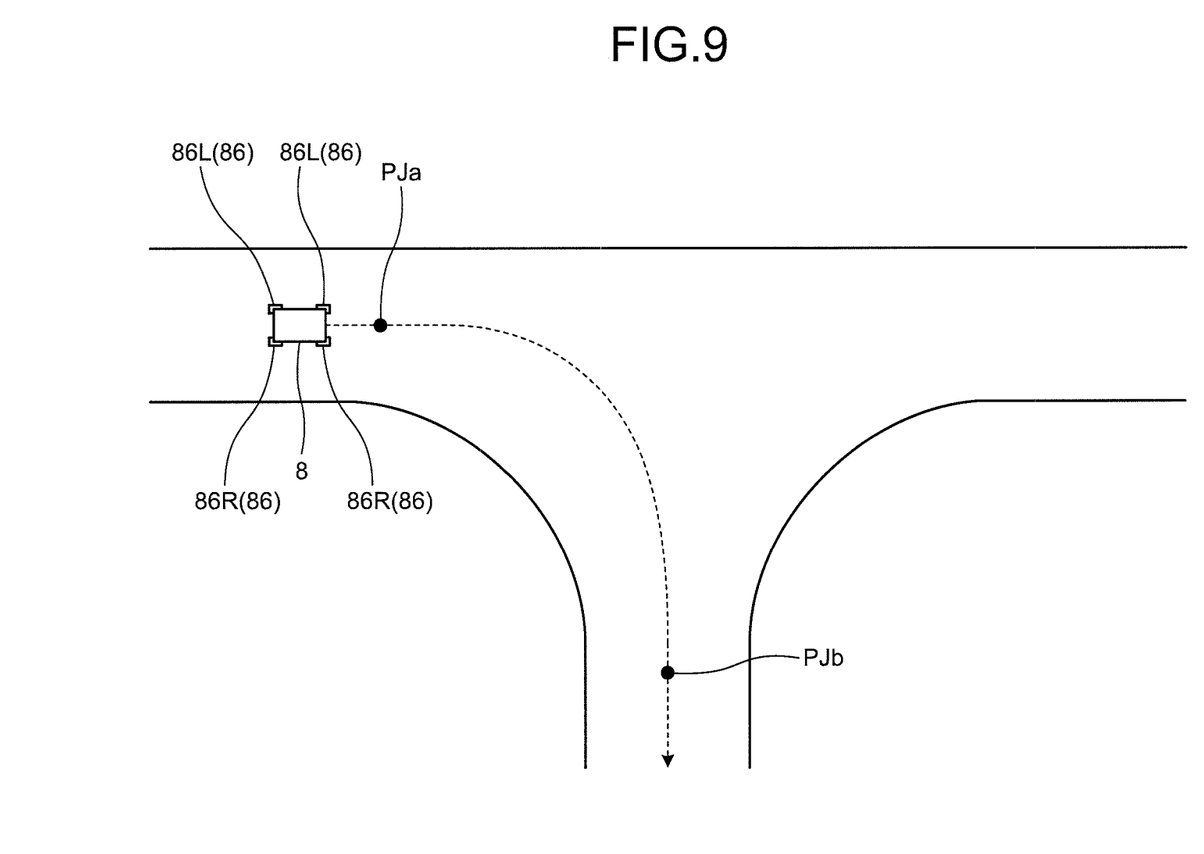
FIG. 9 is a diagram illustrating a test run in a mine by using the manned vehicle according to the present embodiment.

FIG. 9 is a diagram illustrating the test run in the mine by using the manned vehicle 8 according to the present embodiment. The target travel route RP is set to an unpaved mine road. The manned vehicle 8 travels in the mine and carries out a test run for generating the target travel route RP. The driver WM drives the manned vehicle 8 along a candidate route in the mine along which the dump truck 2 is caused to travel.

The manned vehicle 8 travels in the mine while transmitting position data of the manned vehicle 8 to the management device 10. The position detector 85 of the manned vehicle 8 acquires the position data of the manned vehicle 8 with a predetermined sampling period and transmits the position data of the manned vehicle 8 detected by the position detector 85 to the management device 10 via the wireless communication device 84 in real time.

When there is an intersection on the candidate route in the mine and the manned vehicle 8 turn right or lett at the intersection, the driver WM of the manned vehicle 8 operates the operation device 87 to operate the direction indicators 86 of the manned vehicle 8. Thus, it is possible to give a warning about the traveling direction of the manned vehicle 8.

For example, as illustrated in FIG. 9, when the manned vehicle 8 turns right at the intersection of the candidate route in the mine, the driver WM operates the operation device 87 so that the blinker lamps 86R for turning right operate. By operating the operation device 87, the blinker lamps 86R are lit or blinked.

When the manned vehicle 8 passes through a position PJa of the candidate route in the mine, the driver WM operates the operation device 87 to start the operation of the blinker lamps 86R of the direction indicators 86. In the example illustrated in FIG. 9, when the manned vehicle 8 passes through the position PJa, the direction indicators 86 start to operate, and when the manned vehicle 8 passes a position PJb, the direction indicators 86 finish the operation thereof.

Operation data of the direction indicators 86 generated by operating the operation device 87 is output to the arithmetic processing unit 82. On the basis of the operation data of the direction indicator 86 output from the operation device 87, the arithmetic processing unit 82 detects a time point at which the operation of the direction indicator 86 starts and a time point at which the operation of the direction indicator 86 ends.

The position PJa of the manned vehicle 8 detected at a time when the direction indicators 86 start to operate and the position PJb of the manned vehicle 8 detected at a time when the direction indicators 86 finish the operation are detected by the position detector 85 and output to the arithmetic processing unit 82 as position data.

Therefore, on the basis of the position data of the manned vehicle 8 and the input operation data of the direction indicators 86, the arithmetic processing unit 82 acquires the position data indicating the position PJa of the manned vehicle 8 detected at a time when the direction indicators 86 start to operate and the position data indicating the position PJb of the manned vehicle 8 detected at a time when the direction indicators 86 finish the operation.

The arithmetic processing unit 82 generates link data by associating the position data of the manned vehicle 8 with the operation data of the direction indicator 86. The link data may be the position data indicating the position PJa of the manned vehicle 8 detected at a time when the direction indicators 86 start to operate and the position data indicating the position PJb of the manned vehicle 8 detected at a time when the direction indicators 86 finish the operation or may be data obtained by simply combining position data of the manned vehicle 8 with operation data of the direction indicators 86 (turning off, right-turn lighting, left-turn lighting, simultaneous right-turn lighting and left-turn lighting) at the corresponding position.

The input/output unit 81 transmits link data generated by the arithmetic processing unit 82 to the management device 10 via the wireless communication device 84.

The manned-vehicle-data acquisition unit 121 of the management device 10 acquires position data and operation data (link data) transmitted from the manned vehicle 8 (step SP1).

On the basis of the position data output from the manned vehicle 8 and acquired by the manned-vehicle-data acquisition unit 121, the target-travel-route generation unit 122 generates traveling condition data including a target travel route RP being a target traveling route of a dump truck 2 (step SP2).

The blinker-data setting unit 123 sets blinker data for controlling the direction indicators 37 of the dump truck 2 on the basis of the link data acquired by the manned-vehicle-data acquisition unit 121 (step SP3).

In the present embodiment, the blinker-data setting unit 123 sets blinker data, for example, to the target travel route RP generated by the target-travel-route generation unit 122. More specifically, the blinker-data setting unit 123 may add the blinker data to a plurality of course points PI of the target travel route RP. That is, the blinker-data setting unit 123 adds the set blinker data to the traveling condition data.

The input/output unit 15 of the management device 10 outputs the traveling condition data including the blinker data and the target travel route RP to the dump truck 2 via the wireless communication device 18 (step SP4).

Figure 10:
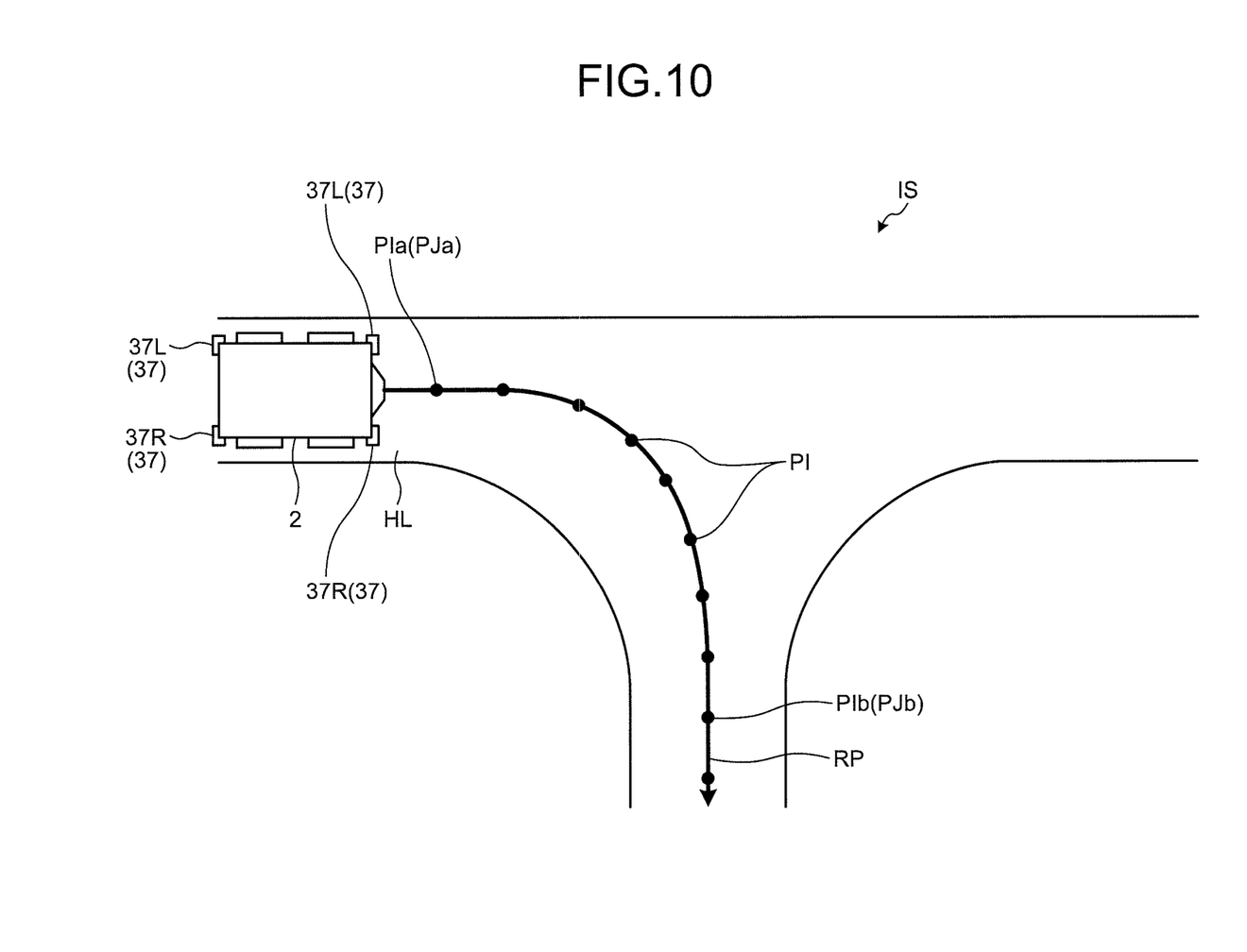
FIG. 10 is a diagram illustrating traveling control and direction indicator control for a dump truck according to the present embodiment.

FIG. 10 is a schematic diagram illustrating an example of a dump truck 2 receiving transmission of blinker data and a target travel route RP, and traveling along the target travel route RP in accordance with the blinker data.

In the present embodiment, as illustrated in FIG. 10, blinker data is set so that when the dump truck 2 passes through a course point PIa set to a position associated with the position PJa at which the direction indicators 86 of the manned vehicle 8 start to operate, the blinker lamps 37R for turning right of the dump truck 2 start to operate, and when the dump truck 2 passes through a course point PIb set to a position associated with the position PJb at which the direction indicators 86 of the manned vehicle 8 finishes the operation, the blinker lamps 37R for turning right of the dump truck 2 finish the operation. The course point PIa and the course point PIb are included in a plurality of course points PI of the target travel route RP for turning the dump truck 2 right at an intersection IS in the mine.

The position associated with the position PJa at which the direction indicators 86 of the manned vehicle 8 start to operate is not limited to a position the same as the position PJa at which the direction indicators 86 of the manned vehicle 8 start to operate, and also includes, for example, a position located within a predetermined range from the position PJa at which the direction indicators 86 of the manned vehicle 8 start to operate. A position partitioned perpendicular to the traveling direction within a predetermined range of the transportation road HL is also included in the position associated with the position PJa. A position associated with the position PJb at which the operation of the direction indicators 86 of the manned vehicle 8 is finished is also the same as described above.

Furthermore, in the present embodiment, for example, the blinker-data setting unit 123 adds the blinker data to a plurality of specific course points PI positioned between the course point PIa and the course point PIb of the plurality of course points PI of the target travel route RP. Thus, when the dump truck 2 turns right at the intersection IS, the blinker lamps 37R continue to operate in a period during which the dump truck 2 travels from the course point PIa to the course point PIb.

As described above, according to the present embodiment, blinker data for controlling direction indicators 37 of a dump truck 2 is set on the basis of link data output from the manned vehicle 8. Since the direction indicators 37 are controlled on the basis of the set blinker data, the driver of the manned vehicle 8 in the vicinity of the dump truck 2 or a worker working in the mine can understand the traveling direction of the dump truck 2. Therefore, mine safety is improved.

In the present embodiment, operation of the direction indicators 86 of the manned vehicle 8 is started and finished by the operation of the operation device 87 provided in the manned vehicle 8, and the blinker-data setting unit 123 sets blinker data so that the direction indicators 37 of the dump truck 2 start to operate at a position associated with the position PJa at which the direction indicators 86 of the manned vehicle 8 start to operate, and the direction indicators 37 of the dump truck 2 finish the operation at a position associated with the position PJb at which the direction indicators 86 of the manned vehicle 8 finishes the operation. In other words, the operating conditions of the direction indicators 86 of the manned vehicle 8 are reproduced in the direction indicators 37 of the dump truck 2. Therefore, the direction indicators 37 of the dump truck 2 operate under the operating conditions according to the feeling of the driver WM. Therefore, the driver of the manned vehicle in the vicinity of the dump truck 2 or a worker working in the mine can understand the traveling direction of the dump truck 2 without any discomfort.

Furthermore, in the present embodiment, blinker data is generated on the basis of link data acquired during a test run for generating the target travel route RP. Therefore, it is possible to smoothly generate blinker data without hindering the operation of the dump truck 2.

In each of the above embodiments, blinker data set by the blinker-data setting unit 123 is added to traveling condition data generated by the target-travel-route generation unit 122, and the traveling condition data including the blinker data is transmitted from the management device 10 to a dump truck 2. However, the present invention is not limited to the above description, and for example, traveling condition data including no blinker data may be transmitted from the management device 10 to the dump truck 2 so that the blinker data is transmitted from the management device 10 to the dump truck 2 traveling in accordance with the travel condition data, at predetermined time intervals.

In the present embodiment, link data is output from the manned vehicle 8 to the management device 10, but the link data may be output from the manned vehicle 8 to a dump truck 2. The control system 20 of the dump truck 2 may set blinker data on the basis of traveling condition data supplied from the management device 10 and the link data supplied from the manned vehicle 8.

In the embodiment described above, the manned vehicle 8 generates link data on the basis of position data of the manned vehicle 8 and operation data of the direction indicators 86, but the position data of the manned vehicle 8 and the operation data of the direction indicators 86 may be transmitted to the management device 10 via the communication system 9 so that the management device 10 generates link data on the basis of the acquired position data of the manned vehicle 8 and operation data of the direction indicators 86.

In the above embodiment, it is assumed that the link data for generating the target travel route RP is acquired by using the manned vehicle 8 such as a passenger car. For example, the driver WM may get in a dump truck 2 to acquire link data by using the dump truck 2 which the driver WM drives. That is, a first direction indicator and a second direction indicator may be the same direction indicator.

In the above embodiments, as described with reference to FIG. 9, a test run in the mine by using the manned vehicle 8 includes traveling work of the manned vehicle 8 driven by the driver WM along a candidate route in the mine along which a dump truck 2 is caused to travel, but the test run is not limited to this description. For example, the manned vehicle 8 may travel near the edge of the transportation road HL to understand the entire transportation road HL, and then output link data for generating the target travel route RP to the management device 10. The management device 10 may set the target travel route RP to a position distant from the edge of the transportation road HL by a predetermined distance. That is, a dump truck 2 may be used as the manned vehicle 8 for acquiring link data.

In the above embodiment, the link data is generated on the basis of the position data of the manned vehicle 8 and the operation data of the direction indicators 86 in the test run. The position data of the manned vehicle 8 and the operation data of the direction indicators 86 for generating the link data are not limited to data acquired in the test run as long as the position data and the operation data are acquired in the traveling of the manned vehicle 8. For example, when the manned vehicle 8 travels for maintenance of the transportation road HL or a dump truck 2 during operation of the dump truck 2, link data may be generated on the basis of position data of the manned vehicle 8 and operation data of the direction indicators 86 which are acquired during the travel.

In each of the above embodiments, it is assumed that each dump truck 2 is an autonomous dump truck. The dump truck 2 may be a manned dump truck traveling in accordance with driver's operation. In the manned dump truck, an operation device such as a blinker lever for operating the direction indicators 37 is provided and the operation device is operated by the driver. When the dump truck 2 turns right or left at an intersection IS, even though the driver fails to operate the operation device, the control system 20 intervenes in operation of the operation device and lights or blinks the direction indicators 37. That is, the control system 20 performs so-called assist control that assists the driver's operation. This configuration ensures mine safety.

In each of the above embodiments, components such as the manned-vehicle-data acquisition unit 121, the target-travel-route generation unit 122, and the blinker-data setting unit 123 are provided in the management device 10. The components such as the manned-vehicle acquisition unit 121, the target-travel-route generation unit 122, and the blinker-data setting unit 123 may be provided in a dump truck 2. In addition, some of the components such as the manned-vehicle acquisition unit 121, the target-travel-route generation unit 122, the blinker-data setting unit 123 may be provided in the management device 10, and some of the components may be provided in a dump truck 2. Furthermore, at least some of these components may be provided in a device or work machine different from the management device 10 and the dump trucks 2.

In each of the above embodiments, it is assumed that the work machine includes a dump truck operating in a surface mine. The work machine may include a mining machine such as a wheel loader operating in a surface mine.

In each of the above embodiments, the work machine being a mining machine operating in a mine has been described as an example, but the work machine is not limited to the mining machine. The components described in the above embodiments can be applied to any work machine used on a work site.

REFERENCE SIGNS LIST

1 MANAGEMENT SYSTEM
2 DUMP TRUCK (MINING MACHINE)
3 OTHER MINING MACHINES
4 MINING MACHINE
5 POSITIONING SATELLITE
6 REPEATER
7 CONTROL FACILITY
8 MANNED VEHICLE
9 COMMUNICATION SYSTEM
10 MANAGEMENT DEVICE
11 COMPUTER
12 PROCESSING DEVICE
13 STORAGE DEVICE
15 INPUT-OUTPUT UNIT
16 DISPLAY DEVICE
17 INPUT DEVICE
18 WIRELESS COMMUNICATION DEVICE
18A ANTENNA
20 CONTROL SYSTEM
21 TRAVEL UNIT
22 VEHICLE BODY
23 VESSEL
24 DRIVING DEVICE
25 CONTROL DEVICE
26 WHEEL
27 STEERING UNIT
28 BRAKING DEVICE
31 TRAVELING-SPEED DETECTOR
36 WIRELESS COMMUNICATION DEVICE
37 DIRECTION INDICATOR
37L BLINKER LAMP
37R BLINKER LAMP
41 INPUT-OUTPUT UNIT
42 DRIVE CONTROL UNIT
43 BLINKER-DATA ACQUISITION UNIT
44 BLINKER CONTROL UNIT
45 ABSOLUTE-POSITION-DATA ACQUISITION UNIT
46 STORAGE UNIT
80 COMPUTER
81 INPUT-OUTPUT UNIT
82 ARITHMETIC PROCESSING UNIT
83 STORAGE UNIT
84 WIRELESS COMMUNICATION DEVICE
85 POSITION DETECTOR
86 DIRECTION INDICATOR
87 OPERATION DEVICE
88 INPUT DEVICE
89 DISPLAY DEVICE
121 MANNED-VEHICLE-DATA ACQUISITION UNIT
122 TARGET-TRAVEL-ROUTE GENERATION UNIT
123 BLINKER DATA SETTING UNIT
124 ABSOLUTE-POSITION-DATA ACQUISITION UNIT
CR CRUSHER
DPA DUMPING AREA
HL TRANSPORTATION ROAD
IS INTERSECTION
LPA LOADING AREA
PA WORKSITE
RP TARGET TRAVEL ROUTE

The invention claimed is:

1. A work machine management device comprising:
a manned-vehicle-data acquisition unit configured to acquire position data of a manned vehicle and operation data of a first direction indicator provided to the manned vehicle;
a target-travel-route generation unit configured to generate a target travel route for a work machine;

a blinker-data setting unit configured to set blinker data for controlling a second direction indicator of the work machine on the basis of link data obtained by associating the position data of the manned vehicle with the operation data of the first direction indicator; and an output unit configured to output the blinker data to the work machine traveling along the target travel route.

2. The work machine management device according to claim 1, wherein the link data includes the position data of the manned vehicle obtained when the first direction indicator starts an operation and the position data of the manned vehicle obtained when the first direction indicator finishes the operation, and the blinker-data setting unit is configured to set the blinker data to cause the second direction indicator to start operating at a position associated with a position at which the first direction indicator starts the operation and cause the second direction indicator to finish operating at a position associated with a position at which the first direction indicator finishes the operation.

3. A work machine comprising:

a manned-vehicle-data acquisition unit configured to acquire position data of a manned vehicle and operation data of a first direction indicator provided to the manned vehicle;

a target-travel-route generation unit configured to generate a target travel route for a work machine; and a blinker-data setting unit configured to set blinker data for controlling a second direction indicator of the work machine on the basis of link data obtained by associating the position data of the manned vehicle with the operation data of the first direction indicator, wherein the second direction indicator of the work machine is controlled on the basis of the set blinker data.

4. A work machine management system comprising:

a manned-vehicle-data acquisition unit configured to acquire position data of a manned vehicle and operation data of a first direction indicator provided to the manned vehicle;

a blinker-data setting unit configured to set blinker data for controlling a second direction indicator of a work machine on the basis of the position data of the manned vehicle and the operation data of the first direction indicator; and an output unit configured to output the blinker data to the work machine.

5. The work machine management device according to claim 1, wherein the manned-vehicle-data acquisition unit acquires, from the manned vehicle, the link data obtained by associating position data of the manned vehicle with operation data of the first direction indicator of the manned vehicle.

6. The work machine management device according to claim 1, wherein, to set blinker data, the blinker-data setting unit adds the blinker data to a plurality of course points of the target travel route, and wherein the output unit outputs the target travel route to the work machine.

* * * * *